US011458699B2

(12) United States Patent
Jenkins et al.

(10) Patent No.: US 11,458,699 B2
(45) Date of Patent: Oct. 4, 2022

(54) FABRICATING A LENS ASSEMBLY

(71) Applicant: Meta Platforms Technologies, LLC, Menlo Park, CA (US)

(72) Inventors: Kurt Allen Jenkins, Sammamish, WA (US); Chad Lichtenhan, Issaquah, WA (US); Michael Patrick Schaub, Redmond, WA (US); Byron Taylor, Sammamish, WA (US)

(73) Assignee: Meta Platforms Technologies, LLC, Menlo Park, CA (US)

(*) Notice: Subject to any disclaimer, the term of this patent is extended or adjusted under 35 U.S.C. 154(b) by 435 days.

(21) Appl. No.: 16/706,859

(22) Filed: Dec. 9, 2019

(65) Prior Publication Data

US 2021/0170703 A1    Jun. 10, 2021

(51) Int. Cl.
    *B29D 11/00*    (2006.01)
    *G02B 1/04*     (2006.01)
    *G06F 1/16*     (2006.01)

(52) U.S. Cl.
    CPC ........ *B29D 11/00009* (2013.01); *G02B 1/041* (2013.01); *G06F 1/163* (2013.01)

(58) Field of Classification Search
    CPC .............. B29D 11/00; B29D 11/00009; B29D 11/00028; B29D 11/00403; B29D 11/00423; B29D 11/00442; B29D 11/0048; G02B 1/04; G02B 1/041; G02B 1/111; G02B 1/115; G02B 1/118; G06F 1/163; G06F 1/1633; G06F 1/1637; G06F 1/1647
    See application file for complete search history.

(56) References Cited

U.S. PATENT DOCUMENTS

| 4,121,896 | A | 10/1978 | Shepherd |
| 2005/0058773 | A1* | 3/2005 | Hasei ............... B29D 11/00365 427/162 |
| 2008/0055736 | A1 | 3/2008 | Tsuji et al. |
| 2013/0300009 | A1 | 11/2013 | Oganesian et al. |
| 2013/0314591 | A1 | 11/2013 | Eromaki |
| 2015/0158259 | A1* | 6/2015 | Yamamoto ....... B29D 11/00644 264/1.32 |
| 2019/0204527 | A1 | 7/2019 | Nakajima |
| 2021/0283871 | A1* | 9/2021 | Lee .................... B29C 41/14 |

OTHER PUBLICATIONS

International Searching Authority, Patent Cooperation Treaty, European Application No. PCT/US2020, dated Feb. 3, 2021, 7 pages./ 058439.
International Searching Authority, Patent Cooperation Treaty, Written Opinion of the International Searching Authority, European Application No. PCT/US2020/058439, dated Feb. 3, 2021, 9 pages.

* cited by examiner

*Primary Examiner* — Sultan Chowdhury
(74) *Attorney, Agent, or Firm* — Freestone Intellectual Property Law PLLC; Aaron J. Visbeek (57) ABSTRACT

A lens assembly includes a tube in which optical elements such as lenses or micro-lenses are individually fabricated by dispensing a volume of curable optical polymer into the tube, forming the desired shape for the optical element using one or more plungers having heads corresponding to a desired lensing curvature, applying radiant energy to the tube with the plungers in place to cure the optical polymer, and repeating as needed until the desired number of optical elements are fabricated within the lens assembly which may then be integrated as a single piece into a mobile or wearable device.

20 Claims, 9 Drawing Sheets

FABRICATING A LENS ASSEMBLY

BACKGROUND INFORMATION

Lenses, micro-lenses and other types of optical elements are commonly included in today's mobile and wearable devices for use in imaging, virtual reality and other such applications. New opportunities exist for fabricating a lens assembly including of a group of optical elements that are aligned during the fabrication, the lens assembly forming a single unit that may subsequently be integrated into a mobile or wearable device.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of an apparatus, system, and method for fabricating a lens assembly are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The apparatus, system, and method for fabricating a lens assembly that are described in this disclosure include a tube into which a precise volume of curable optical polymer is conveyed. The volume of optical polymer is engaged by at least one plunger inserted into the tube, the plunger having a lensing curvature which causes the optical polymer adjacent to the plunger to take on a shape defined by the curvature. Radiant energy is applied to the tube and polymer from the outside of the tube. The radiated energy passes into the tube and cures the polymer, causing the polymer to form a rigid optical element. The plunger is then removed from the tube, leaving the rigid optical element with the aforementioned lensing curvature. One or more additional optical elements may be formed within the tube through successive operations of inserting polymer into the tube, engaging the polymer with a plunger having a desired lensing curvature, and curing the polymer. The resulting lens assembly is therefore constructed in a beneficial manner in which the optical elements within the tube may be aligned coaxially along the optical axes of the individual elements, with the tube then being able to be easily integrated as a single lens assembly component of a virtual reality system, head mounted display, or other mobile or wearable device. These and other embodiments are described in more detail in connections with FIGS. 1-8.

Figure 1:
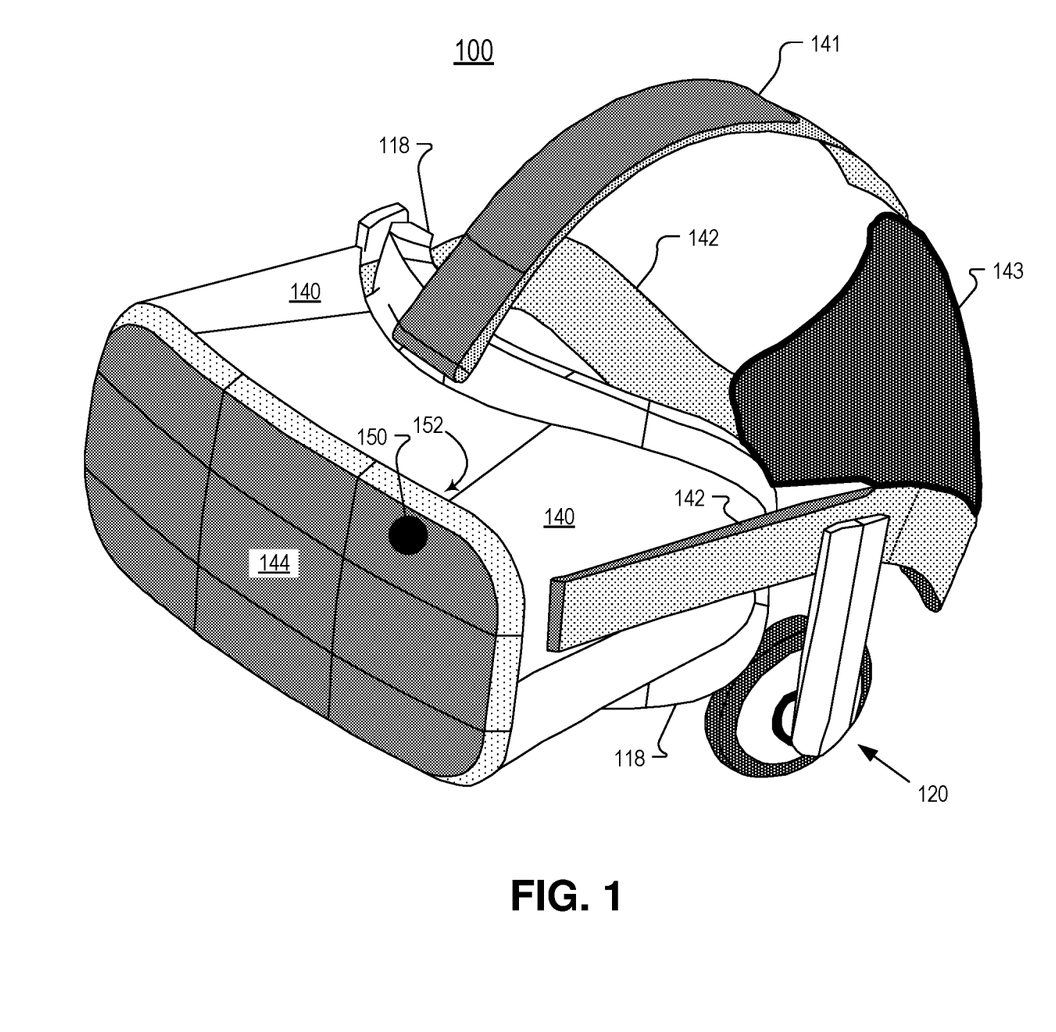
FIG. 1 is a perspective view of a head mounted display (HMD) into which a lens assembly fabricated in accordance with an embodiment of the disclosure has been integrated.

FIG. 1 is a perspective view of a head mounted display (HMD) 100 into which a lens assembly is integrated, in accordance with an embodiment of the disclosure. The illustrated example of HMD 100 is shown as including a viewing structure 140, a top securing structure 141, a side securing structure 142, a rear securing structure 143, and a front rigid body 144. In some examples, the HMD 100 is configured to be worn on a head of a user of the HMD 100, where the top securing structure 141, side securing structure 142, and/or rear securing structure 143 may include a fabric strap including elastic as well as one or more rigid structures (e.g., plastic) for securing the HMD 100 to the head of the user. HMD 100 may also optionally include one or more earpieces 120 for delivering audio to the ear(s) of the user of the HMD 100.

The illustrated example of HMD 100 also includes an interface membrane 118 for contacting a face of the user of the HMD 100, where the interface membrane 118 functions to block out at least some ambient light from reaching to the eyes of the user of the HMD 100.

Example HMD 100 may also include a chassis for supporting hardware of the viewing structure 140 of HMD 100 (chassis and hardware not explicitly illustrated in FIG. 1). The hardware of viewing structure 140 may include any of processing logic, wired and/or wireless data interface for sending and receiving data, graphic processors, and one or more memories for storing data and computer-executable instructions. In one example, viewing structure 140 may be configured to receive wired power and/or may be configured to be powered by one or more batteries. In addition, viewing structure 140 may be configured to receive wired and/or wireless data including video data.

In some examples, an eye-tracking camera (not explicitly shown in FIG. 1) may be included in viewing structure 140 to capture image(s) of an eye of a user of HMD 100. Viewing structure 140 may also include a display system having one or more electronic displays for directing light to the eye(s) of a user of HMD 100. The display system may include one or more of an LCD, an organic light emitting diode (OLED) display, or micro-LED display for emitting light (e.g., content, images, video, etc.) to a user of HMD 100.

HMD 100 may include an integrated lens assembly 150 oriented for operation in conjunction with an image sensor 152 in order to focus an image with particular image characteristics onto an image plane. The integrated lens assembly 150 includes at least one optical element having a refractive index that corresponds to the desired image characteristics. In some embodiments, the integrated lens assembly bears two or more optical elements within a tube, the optical elements resting against one another and aligned coaxially along the optical axes of the individual elements. HMD is an example of a device that integrated lens assembly 150 may be included in. However, integrated lens assembly 150 may be incorporated into any device.

Figure 2A:
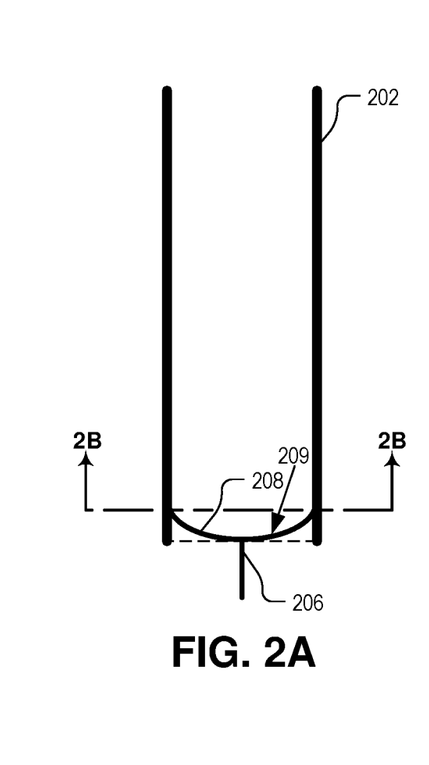
FIG. 2A is a front view of system elements which may be employed in fabricating a lens assembly, in accordance with an embodiment of the disclosure.
Figure 2B:
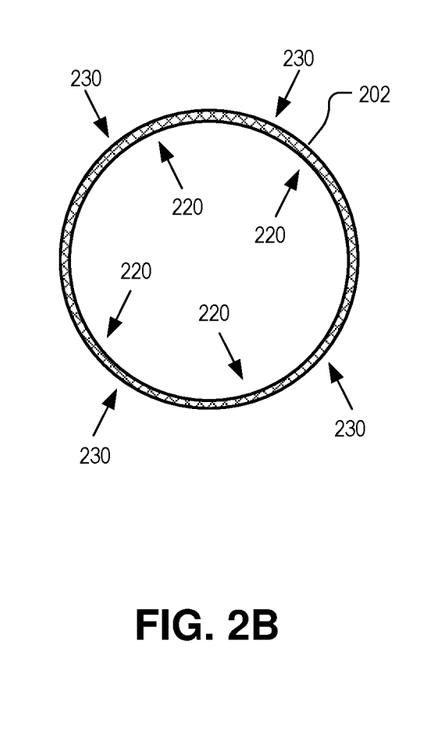
FIG. 2B is a top cross-sectional view of a tube that may be employed in fabricating a lens assembly, in accordance with an embodiment of the disclosure.

FIGS. 2A and 2B are a front view and a top cross-sectional view of a tube 202 which provides the framework in which the optical elements are individually fabricated, transforming the tube 202 and fabricated optical elements into the lens assembly 150 discussed with respect to FIG. 1. A cross-section of the tube 202 may be circular, or the cross-section may have an oval form or other profile (e.g. square, rectangular, etc.), according to the desired cross-sectional shape of the optical elements formed within the tube 202 and/or according to a cavity shape within a device such as HMD 100 that will receive the lens assembly. In some embodiments, the tube 202 is optically transparent to at least some wavelengths of light. Those wavelengths could include one or more of ultraviolet (UV) light, infrared (IR) light, or light of a different wavelength. In other embodiments, the tube 202 permits heat to pass through the sides of the tube 202. The tube 202 may be constructed of glass, plastic, or another material having a desired transparency characteristic, and may be open-ended on one or both ends. In some embodiments, a tube 202 may be segmented such that vertical segments of the tube 202 have differing shapes. For example, a tube 202 may have a stepped shape in which the diameter of a first cylindrical tube cross-section may be different from a diameter of a second cylindrical tube cross-section. The foregoing stepped shape may aid in creation of optical elements formed within the tube 202 that have varying diameters. Alternatively, a tube 202 may have one or more tapering characteristics. For example, a tube 202 may be wider at its top and narrower at its bottom, resulting from a narrowing taper from top to bottom of tube 202. A taper may also aid in creation of optical elements formed within tube 202 having varying diameters. Alternatively, a stepped shape or taper of tube 202 may provide a particular shape for the finished lens assembly which suits the needs of the device in which the lens assembly will be placed.

The tube 202 is held in place vertically by a fixture (not shown) and is plumb (e.g., the sides of the tube 202 are parallel to the force of gravity). A first plunger 206 may be inserted into the tube 202 from a bottom end of the tube 202. The first plunger 206 includes a first plunger head 208. The first plunger head 208 may include a cavity, the curvature of the cavity defining a desired lensing curvature 209 for the bottom surface of a first optical element fabricated in the assembly. While the cavity of the first plunger head 208 shown in the figures is concave with respect to the top of the tube, the first plunger head 208 may be concave, convex, or have another shape according to the particular curvature needs for the first optical element of the desired lens assembly. For example, in some aspects, a curvature provided by a plunger head is constant across a surface such that the surface may be referred to as spherical. A concave or convex plunger head cavity may provide the aforementioned constant curvature. In other aspects, a curvature may be aspherical where the curvature varies over the surface, and a correspondingly shaped plunger head may be provided. The curvature provided by a plunger head may not necessarily be rotationally symmetric. In yet another aspect, the plunger head 208 may include a diffractive structure to form a diffractive optical element. The plunger head 208 is sized to closely fit an inside shape of the tube 202 (i.e. the plunger head 208 has a perimeter resting against the interior sidewall 220 of the tube 202 and has an outer boundary just smaller than the inner boundary of the tube 202, etc.). Alternatively, a bottom face of the tube 202 may be closed such that a bottom surface of a first optical element fabricated in the assembly is flat. Interior sidewall 220 is disposed opposite of exterior sidewall 230 (i.e. exterior sidewall 230 is disposed along the outer wall of tube 202).

Figure 3A:
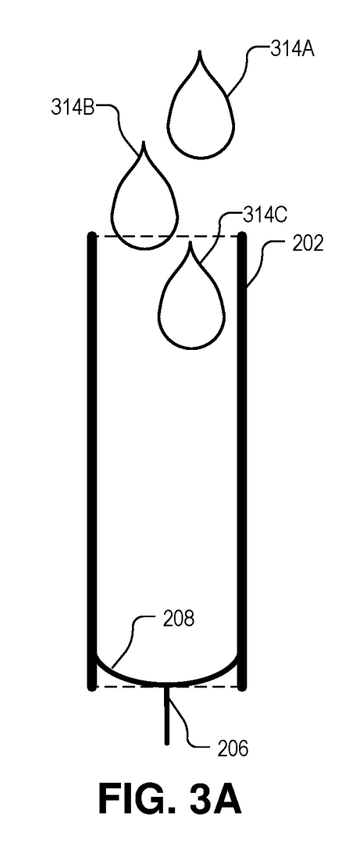
FIGS. 3A-3D are front views of system elements in use during fabrication of a first optical element of a lens assembly, in accordance with an embodiment of the disclosure.

Turning to FIG. 3A, a volume of curable optical polymer 314 is provided to the tube 202. A source, such as a syringe (not shown), is controlled to dispense a precise volume of the optical polymer, which falls or is otherwise conveyed into the tube. Should the polymer be composed of one or more drops (such as polymer drop 314A, 314B, and 314C depicted in FIG. 3A), upon landing upon the first plunger head 208 the polymer drops coalesce to form a single volume. The close fit of the plunger head 208 to the inside shape of the tube 202 ensures that all optical polymer 314 conveyed into the tube 202 remains within the tube 202 (i.e. that no portion of optical polymer 314 runs past the plunger 206 and out through the bottom of the tube 202).

Figure 3B:
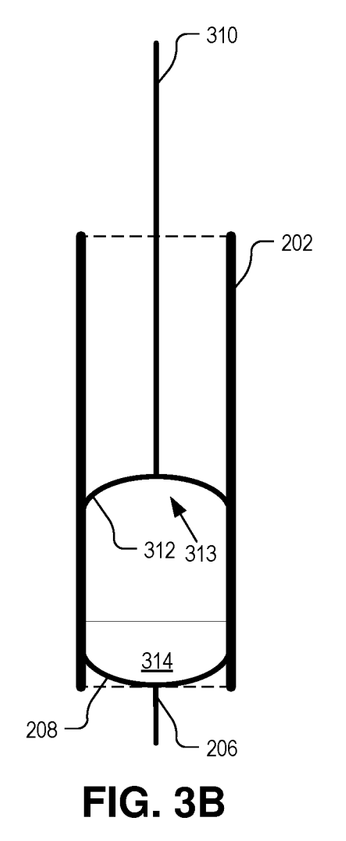

As shown in FIG. 3B, upon the volume of curable optical polymer 314 being positioned atop the head 208 of the first plunger 206, a second plunger 310 is inserted into the top of tube 202. The second plunger 310 includes a second plunger head 312. The second plunger head 312 may include a cavity. The curvature of the cavity may define a desired lensing curvature 313 for the top surface of the first optical element fabricated in the assembly. While the cavity of the second plunger head 312 shown in the figures is concave with respect to the bottom of the tube, the second plunger head 312 may be concave or convex.

Figure 3C:
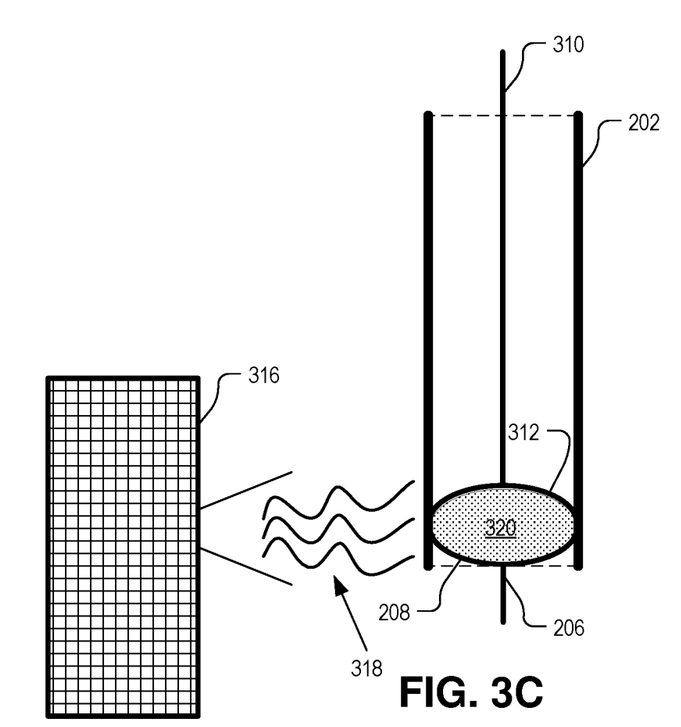

As shown in FIG. 3C, the second plunger 310 is brought into contact with the volume of the curable optical polymer, causing the volume to conform to the curvature of the first and second plunger heads 208 and 312 and take on the desired shape for the optical element 320. Like the first plunger head 208, the second plunger head 312 is sized to closely fit an inside shape of the tube 202, preventing any of the precisely-measured volume of optical polymer from passing between the plunger head 312 and the sides of the tube. A curing operation occurs while the second plunger 310 is in the tube 202, which may involve radiant energy 318 being passed through the tube 202, the radiant energy 318 emanating from an energy source 316. In some embodiments, the radiant energy 318 is light having a particular wavelength selected in order to propagate through the tube 202 to illuminate the volume of the curable optical polymer, and the energy source 316 is an emitter of the light having the particular wavelength. For example, the energy source 316 may be an ultraviolet lamp or LED, and radiant energy 318 may be ultraviolet light, the ultraviolet lamp and light corresponding to optical polymer which is reactive particularly to ultraviolet light. In other embodiments, the radiant energy 318 is thermal energy selected to propagate through the tube 202 and heat the volume of curable optical polymer. The radiant energy 318 may also propagate through the first plunger head 208 and/or the second plunger head 312, either via light or heat. The curing operation may include ceasing or diminishing thermal energy as radiant energy 318 so that optical element 320 is allowed to cool and cure.

Figure 3D:
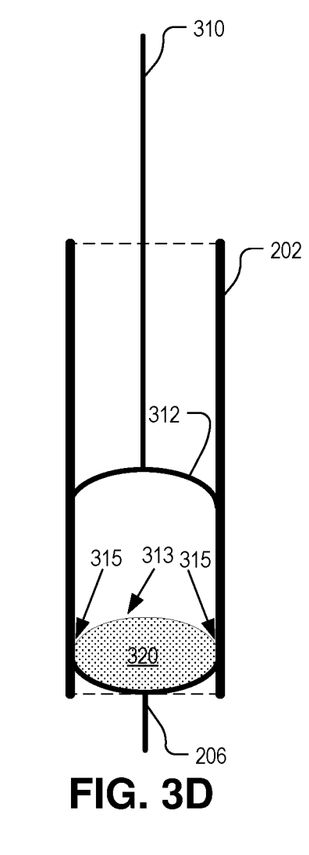

As shown in FIG. 3D, the second plunger 310 is removed from the tube 202 after the curing operation. During the curing operation, the optical polymer hardens in order to retain its molded shape upon the second plunger 310 being removed from the tube 202. Following removal of the second plunger 310 from the tube 202, the cured optical polymer remains in the tube 202, forming an optical element 320 including a top lensing curvature 313 defined by the head 312 of the second plunger 310. In some embodiments, during curing the optical polymer may shrink. To account for the change in volume of the polymer while still obtaining an optical element of the desired curvature and size, a plunger head size or shape is selected and/or adjusted to account for anticipated shrinkage of the volume of optical polymer in accordance with known shrink characteristics of the particular optical polymer in use. In some aspects, plunger head 208 and/or plunger head 310 imparts a diffractive structure into the optical polymer to form a diffractive optical element as optical element 320.

In some embodiments, at least a part of the optical element 320 remains adhered to the interior sidewall of the tube 202 after removal of the second plunger 310. For example, an outer boundary or ring 315 of the optical element 320 in contact with the inside of tube 202 may bond with the inside of tube 202 at an interior sidewall of the tube (i.e. interior sidewall 220 as illustrated in FIG. 2B) as a result of the curing operation. The bond of the ring 315 around the optical element 320 to the inside of the tube created during curing may cause the optical element to adhere to the tube 202 and remain in place following removal of the second plunger 310. The ring 315 portion of optical element 320 bonding to the tube 202 during the curing operation may result, for example, from the precise metering of just enough optical polymer into tube 202 to cause the optical polymer to flow in a thin stream, upon insertion of the second plunger 310, all the way to the interior sidewall of the tube 202.

Figure 4A:
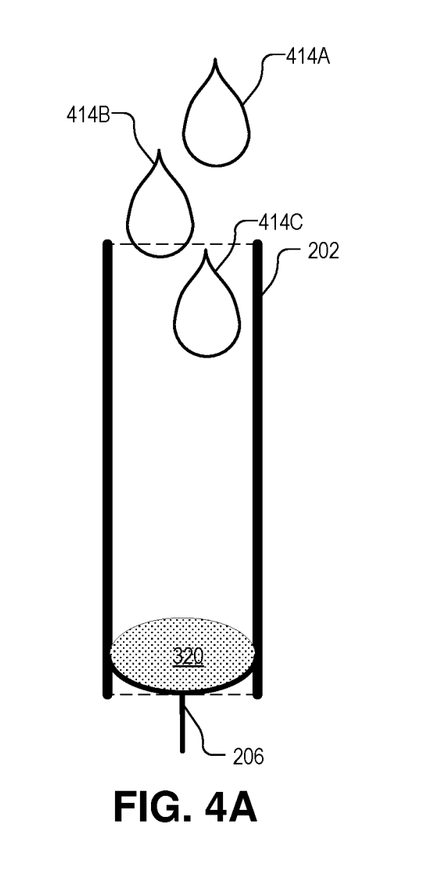
FIGS. 4A-4D are front views of system elements in use during fabrication of a second optical element of a lens assembly, in accordance with an embodiment of the disclosure.

FIGS. 4A-4D illustrate front views of the tube 202 having the first optical element 320 present. In subsequent operations, fabrication of a second optical element on top of the first optical element takes place. As shown in FIG. 4A, a volume of curable optical polymer 414 is provided to the tube 202. The curable optical polymer 414 may be the same material discussed with respect to FIG. 3A (i.e. it may be the same material as the curable optical polymer 314 provided to the tube to fabricate the first optical element 320). Alternatively, the curable optical polymer 414 may have different optical characteristics, such as a different refractive index, different corresponding light wavelength or corresponding temperature for curing, or other difference. The polymer may be composed of one or more drops, such as polymer drop 414A, 414B, and 414C depicted in FIG. 4B that coalesce upon landing to form a single volume.

Figure 4B:
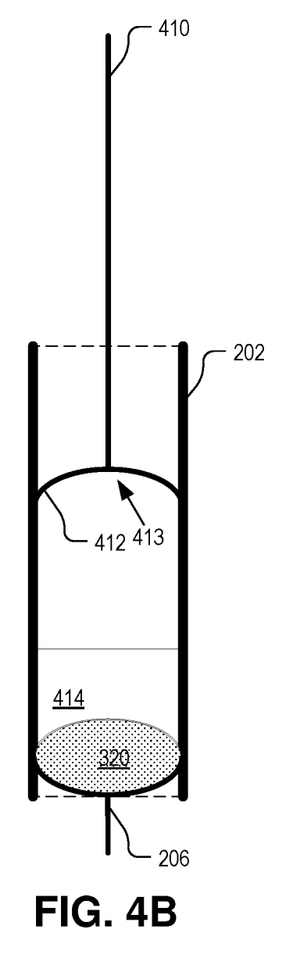

As shown in FIG. 4B, upon the volume of curable optical polymer 414 being positioned atop the top surface of the first optical element 320, a subsequent plunger 410 is inserted into the top of the tube 202. The subsequent plunger 410 includes plunger head 412, which may include a surface defining a desired lensing curvature 413 for the top surface of the second optical element. The surface of the plunger head 412 may be concave or convex according to the particular needs for the top surface of the second optical element of the desired lens assembly. (The plunger head 412 is depicted in FIGS. 4B-4D as being concave with respect to the bottom of the tube).

Figure 4C:
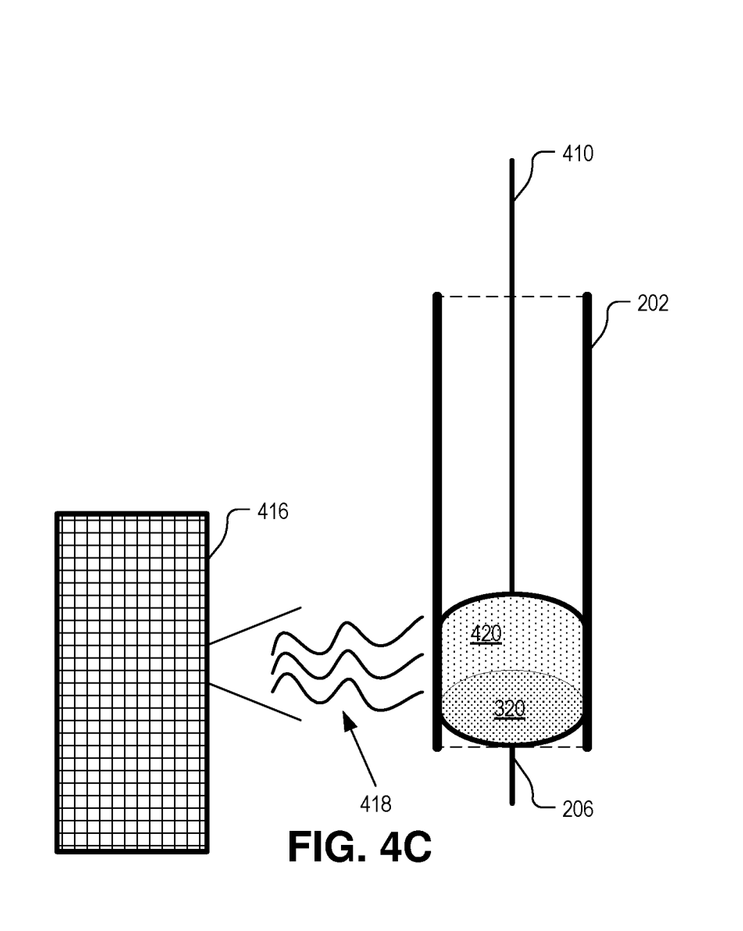

As shown in FIG. 4C, the subsequent plunger 410 is brought into contact with the volume of curable optical polymer 414, causing the volume to conform to the curvature of the top surface of the first optical element 320 and to the curvature 413 of the subsequent plunger head 412 in order to take on the desired shape for the second optical element 420. Another curing operation occurs while the subsequent plunger 410 is in the tube 202, which may involve radiant energy 418 being passed through the tube 202, the radiant energy 418 emanating from an energy source 416. Radiant energy 418 may have the same or a different wavelength or other radiant property as needed to correspond to the curing requirements of the curable optical polymer 414. The subsequent plunger head 412 may have the same curvature 413 as the head of the first or second plungers described with respect to FIGS. 3A-3D, or may have a different curvature 413, whereby a difference in optical elements fabricated with the various plungers having the same curvature may be effected through the use of optical polymers having differing refractive indices, for example.

Figure 4D:
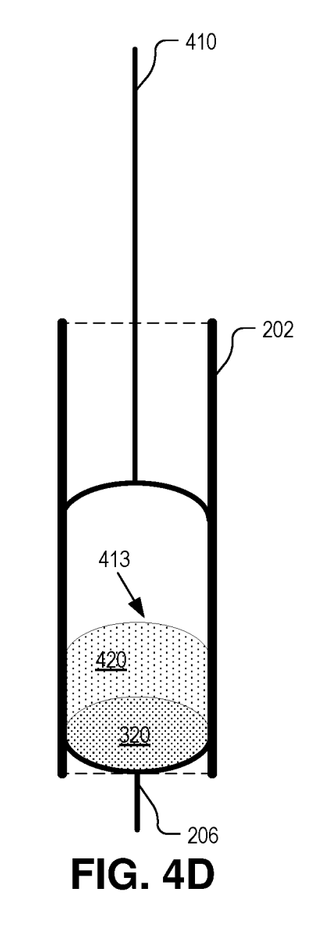

As shown in FIG. 4D, the subsequent plunger 410 is removed from the tube 202 after the curing operation. Following removal of the subsequent plunger 410 from the tube 202, the cured optical polymer remains in the tube, forming a second optical element 420 atop, and in contact with, the first optical element 320, the second optical element 420 including a bottom lensing curvature which is the inverse of the top lensing curvature of the first optical element 320 and including a top lensing curvature 413 defined by the head 412 of the subsequent plunger 410. The optical axes of the first optical element 320 and the second optical element 420 will be aligned as a result of fabrication operations occurring within a circular cross-sectioned tube that is held in place vertically by the fixture.

In some embodiments, at least a part of the second optical element 420 remains adhered to the interior sidewall of the tube 202 after removal of the subsequent plunger 410. The adherence of the second optical element 420 to the interior sidewall of the tube 202 may occur in substantially the same manner as for the adherence of the first optical element 320 to the interior sidewall of the tube 202 described above with respect to FIG. 3D.

The adherence of successive optical elements to the interior sidewall of the tube 202 aligns the successive optical elements along each of the other optical elements' optical axes. Accordingly, a result of the fabrication of the optical elements inside the tube 202 such that the outer boundaries of the optical elements bond to corresponding interior sidewalls of the tube 202 is that the optical elements, upon being fabricated within the tube 202, have optical axes that are coaxial.

Figure 5:
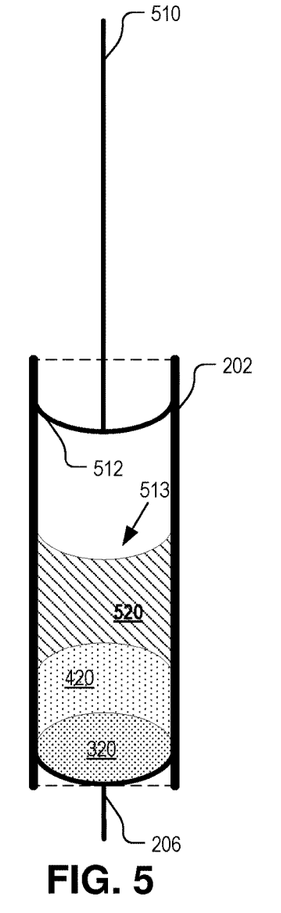
FIG. 5 is a front view of a partially-constructed lens assembly having a third optical element, in accordance with an embodiment of the disclosure.

Turning to FIG. 5, the partially-constructed lens assembly is shown following another set of operations similar to those depicted in FIGS. 3A-3D and FIGS. 4A-4D. That is, a volume of optical polymer has been provided to the tube 202, resting upon the top surface of optical element 420; a plunger 510 has been inserted into the tube 202 with plunger head 512 coming into contact with the volume of optical polymer; a curing operation has occurred; and the plunger 510 is removed from the tube 202 subsequent to the volume of optical polymer being cured, resulting in a third optical element 520 having been formed with a bottom lensing curvature defined by the top surface of optical element 420 and a top lensing curvature 513 defined by the cavity of plunger head 512 of the plunger 510. In this exemplary embodiment, the plunger head 512 is convex relative to the bottom of the tube 202, but the plunger head 512 may in other embodiments be concave or convex as needed to provide the optical element being fabricated with the desired optical characteristics.

Figure 6:
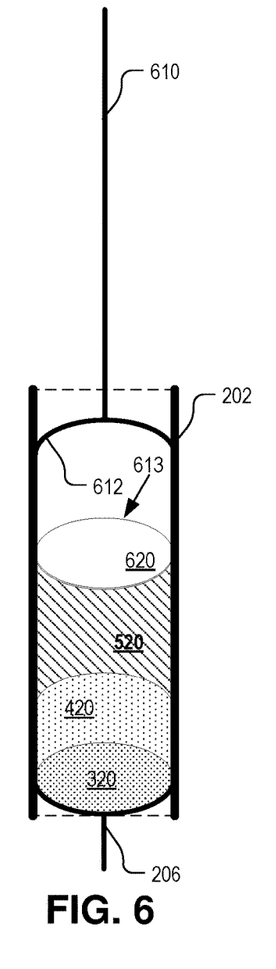
FIG. 6 is a front view of a partially-constructed lens assembly having a fourth optical element, in accordance with an embodiment of the disclosure.

Turning to FIG. 6, the partially-constructed lens assembly is shown following another set of operations similar to those depicted in FIGS. 3A-3D and FIGS. 4A-4D. Particularly, through that set of operations, a fourth optical element 620 is formed within tube 202, the fourth optical element 620 including a bottom lensing curvature defined by the top surface of optical element 520 and a top lensing curvature 613 defined by the cavity of plunger head 612 of plunger 610.

Figure 7A:
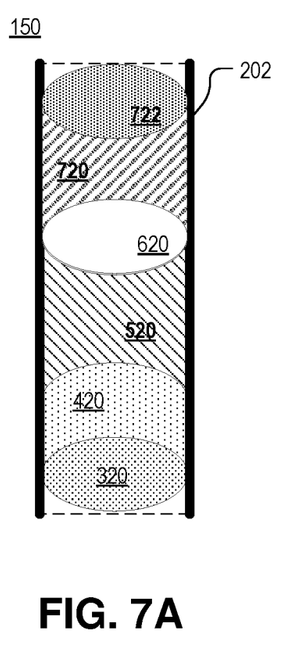
FIG. 7A is a front view of a completed lens assembly including six optical elements, in accordance with an embodiment of the disclosure.

Turning to FIG. 7A, a completed lens assembly 150 is shown in which a fifth optical element 720 and a sixth optical element 722 have been fabricated. The first plunger is also depicted as having been removed from the tube 202. However, no inference should be drawn that it is necessary to leave the plunger in place until after all optical elements are fabricated as it may, in some embodiments, be removed at any time following fabrication of the first optical element. For example, the first optical element 320 may, upon having been fabricated as depicted in FIGS. 3A-3D, have adhered to the interior sidewall of tube 202. Accordingly, upon curing of the first optical element 320, removal of a bottom plunger which was in place during the curing operations may be achieved. Further, while the lens assembly 150 discussed herein features six optical elements in a stack within the tube, the disclosed technique may be applied to create lens assemblies having any number of optical elements.

Figure 7B:
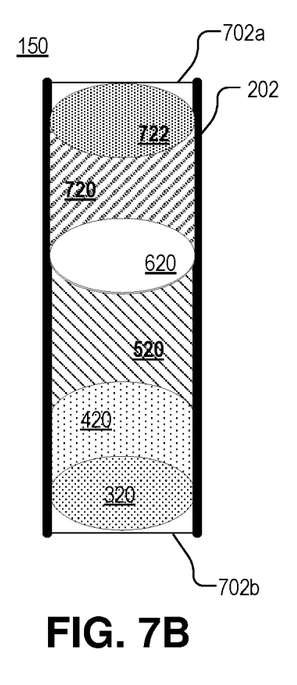
FIG. 7B is a front view of a complete lens assembly having optional protective elements at each end of the assembly, in accordance with an embodiment of the disclosure.

Turning to FIG. 7B, a completed lens assembly 150 is shown in which an optional protective element 702*a* has been applied to the assembly discussed with respect to FIG. 7A at its top and in which an optional protective element 702*b* has been applied to the assembly at its bottom. The optional protective elements may be constructed of glass, plastic, or other transparent material and may be optically neutral or near-neutral so as to not adversely modify the desired optical characteristics yielded by the stack of optical elements within the tube 202. Similarly, during construction of the lens assembly, other elements may be inserted into the tube 202 in between fabrication of optical elements. Such elements may include windows, apertures, preformed glass, or plastic elements. In some embodiment, diffractive optical elements may be included in lens assembly 150. Separating optical elements fabricated inside the tube 202 with such windows, apertures, preformed glass, or plastic elements could allow airspacing between the lens surfaces, apertures between the lens surfaces, and inclusion of glass elements or assemblies to provide, for example, a cemented doublet or other arrangement. In some embodiments, the various optical elements in lens assembly 150 may not necessarily be rotationally symmetric or may not necessarily be in light with an optical axis shared by other optical elements in the lens assembly 150.

Completed lens assembly 150 may be fabricated directly over an image sensor. This may contribute to miniaturizing the space required for a lens assembly to be paired with an image sensor. In one aspect, a lens assembly such as lens assembly 150 may be fabricated over an image sensor where the lens assembly has a nominal focal length. Through focus measurements (e.g. analyzing digital images captured by the image sensor while the lens assembly focuses light onto an imaging plane of the image sensor), an adjustment optical power value may be determined to improve the focus of a camera that includes that specific image sensor paired with a particular lens assembly. Then, the lens assembly may be adjusted according to the adjustment optical power value to improve the focus of the lens assembly. In one example, the lens assembly is adjusted by adjusting a top radius of curvature of an optical element, such as optical element 722.

In some embodiments, following completion of a lens assembly according to the operations disclosed herein, the tube may be coated to prevent light from entering the completed lens assembly from the sides of the tube 202. In some embodiments, coating may include spraying or painting the tube 202, such as with a black and/or absorbing layer. In other embodiments, an operation of removing the tube 202 from the lens assembly stack may occur to decrease a diameter of the finished lens assembly.

Figure 8:
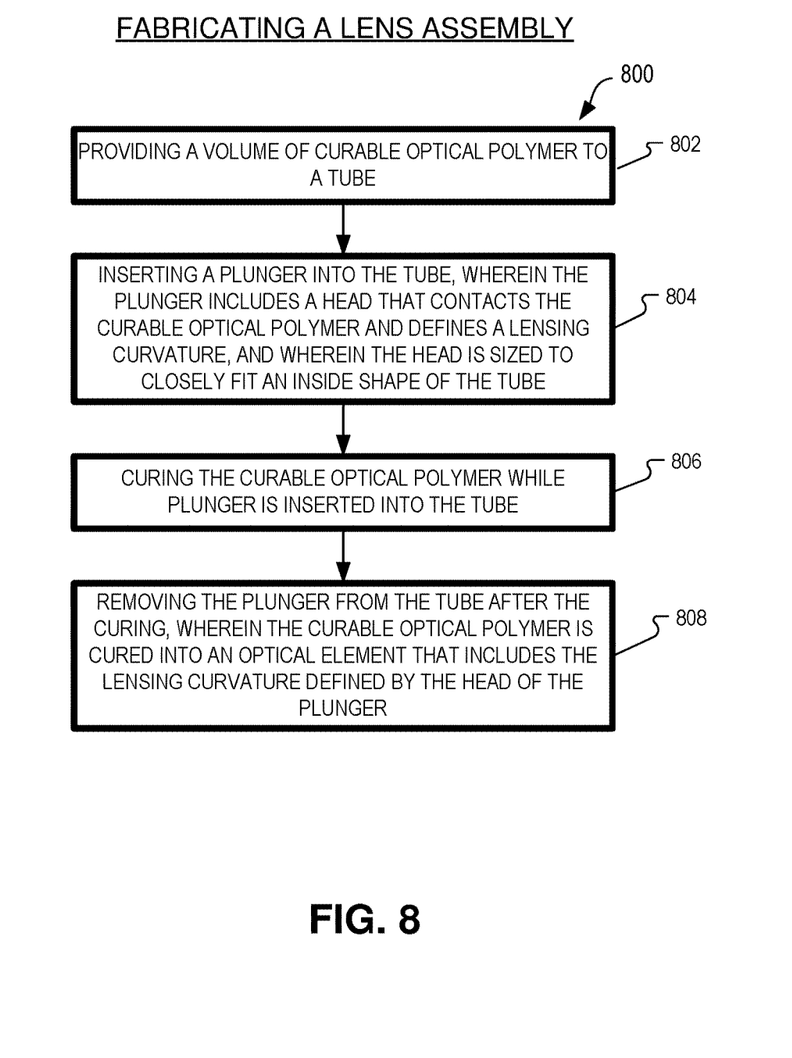
FIG. 8 depicts an operational flow relating to a method of fabricating a lens assembly, in accordance with an embodiment of the disclosure.

FIG. 8 depicts an operational flow 800 relating to a method of fabricating a lens assembly, in accordance with an embodiment of the disclosure. The integrated lens assembly 150 may be fabricated, prior to integration with HMD 100, through the operations of providing a volume of curable optical polymer to a tube at 802 (discussed in more detail with respect to FIG. 3A, above); inserting a plunger into the tube, the plunger including a head that contacts the curable optical polymer and defines a lensing curvature, and the head being sized to closely fit an inside shape of the tube, at 804 (discussed in more detail with respect to FIGS. 3B and 3C, above); curing the curable optical polymer while the plunger is inserted into the tube at 806 (discussed in more detail with respect to FIGS. 3B and 3C, above); and removing the plunger from the tube after the curing, the curable optical polymer having been cured into an optical element that includes the lensing curvature defined by the head of the plunger at 808 (discussed in more detail with respect to FIG. 3D, above).

The order in which some or all of the process blocks appear in process 800 should not be deemed limiting. Rather, one of ordinary skill in the art having the benefit of the present disclosure will understand that some of the process blocks may be executed in a variety of orders not illustrated, or even in parallel.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head mounted display (HMD) connected to a host computer system, a standalone HMD, a mobile device or computing system, or any other hardware platform capable of providing artificial reality content to one or more viewers.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method of fabricating a lens assembly, the method comprising:
    providing a volume of curable optical polymer to a tube;
    inserting a plunger into the tube, wherein the plunger includes a head that contacts the curable optical polymer and defines a lensing curvature, and wherein the head is sized to closely fit an inside shape of the tube;
    curing the curable optical polymer while the plunger is inserted into the tube; and
    removing the plunger from the tube after the curing, wherein the curable optical polymer is cured into an optical element that includes the lensing curvature defined by the head of the plunger.

2. The method of claim 1, wherein the tube is optically transparent to a first wavelength of light, and wherein curing the curable optical polymer includes illuminating the curable optical polymer with the first wavelength of light, the first wavelength of light propagating through the tube to the curable optical polymer.

3. The method of claim 2, wherein the head of the plunger is optically transparent to the first wavelength of light, and wherein curing the curable optical polymer includes the first wavelength of light propagating through the head of the plunger.

4. The method of claim 1 further comprising:
    inserting a second plunger into the tube from a second end of the tube, wherein the plunger is inserted into a first end of the tube opposite the second end of the tube;
    removing the second plunger from the tube after the curing, wherein the lensing curvature of the optical element is disposed on a first side of the optical element, and wherein a second side of the optical element that is opposite the first side is defined by a second curvature of a second head of the second plunger that defines the second curvature.

5. The method of claim 4, wherein curing the optical polymer includes causing at least a portion of the optical element to bond with a portion of the inside shape of the tube.

6. The method of claim 1 further comprising:
    providing a second volume of a second curable optical polymer to the tube;
    inserting a subsequent plunger into the tube, wherein the subsequent plunger includes a subsequent head that contacts the second curable optical polymer and defines a second lensing curvature, and wherein the subsequent head is sized to closely fit an inside shape of the tube;
    curing the second curable optical polymer while the subsequent plunger is inserted in the tube; and
    removing the subsequent plunger from the tube after the curing of the second curable optical polymer, wherein the second curable optical polymer is cured into a second optical element that includes a second lensing curvature defined by the subsequent head of the subsequent plunger.

7. The method of claim 6, wherein the second optical element contacts the lensing curvature of the optical element.

8. The method of claim 7, wherein a side of the second optical element that contacts the lensing curvature of the optical element is concave, and wherein the lensing curvature of the optical element is convex.

9. The method of claim 7, wherein a side of the second optical element that contacts the lensing curvature of the optical element is convex, and wherein the lensing curvature of the optical element is concave.

10. The method of claim 6, wherein a first optical axis of the optical element is axially aligned with a second optical axis of the second optical element.

11. The method of claim 1, wherein the lensing curvature of the optical element is disposed on a first side of the optical element, and wherein a second side of the optical element that is opposite the first side is defined by a bottom of the tube.

12. The method of claim 1, wherein the tube includes a circular cross-section.

13. The method of claim 1, wherein the tube includes an oval-shaped cross-section.

14. The method of claim 1, wherein the volume of the curable optical polymer is selected to provide a precise size of the optical element after curing.

15. The method of claim 1, wherein curing the curable optical polymer includes heating the curable optical polymer using a source of radiant heat external to the tube.

16. The method of claim 1, wherein the second curable optical polymer has a different index of refraction than the first curable optical polymer.

17. A device comprising:
    an image sensor; and
    a lens assembly configured to focus light onto the image sensor, the lens assembly comprising:
        a tube, the tube optically transparent to a first wavelength of ultraviolet (UV) light;
        a first optical element fabricated from a volume of UV curable optical polymer conveyed into the tube, wherein the UV curable optical polymer has a first refractive index, and wherein an outer boundary of the first optical element is cured to the tube; and
        a second optical element fabricated from a second optical polymer having a second refractive index different than the first refractive index.

18. The device of claim 17, wherein a second outer boundary of the second optical element is cured to the tube.

19. A lens assembly comprising:
    a tube, the tube optically transparent to a first wavelength of light;
    an optical element, wherein the optical element is fabricated from a volume of optical polymer conveyed into the tube, the volume of optical polymer bonded to an inside shape of the tube, the volume of the optical polymer having a first refractive index; and
    at least one other optical element, the at least one other optical element fabricated from a second optical polymer conveyed into the tube and bonded to the inside shape of the tube, the second optical polymer having a second refractive index.

20. The lens assembly of claim 19, wherein the tube is transparent to ultraviolet light, and wherein the first wavelength of light is within an ultraviolet light range.

* * * * *